US012734709B2

(12) United States Patent
Ogawa et al.

(10) Patent No.: US 12,734,709 B2
(45) Date of Patent: Sep. 15, 2026

(54) ROBOT SYSTEM, PROCESSING METHOD, AND RECORDING MEDIUM

(71) Applicant: NEC Corporation, Tokyo (JP)

(72) Inventors: Masatsugu Ogawa, Tokyo (JP); Hisaya Wakayama, Tokyo (JP); Masumi Ichien, Tokyo (JP); Nobuharu Kami, Tokyo (JP); Tsutomu Maruyama, Tokyo (JP); Youko Mori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 46 days.

(21) Appl. No.: 18/850,183

(22) PCT Filed: Mar. 30, 2022

(86) PCT No.: PCT/JP2022/016052

§ 371 (c)(1),
(2) Date: Sep. 24, 2024

(87) PCT Pub. No.: WO2023/188127

PCT Pub. Date: Oct. 5, 2023

(65) Prior Publication Data

US 2025/0214258 A1 Jul. 3, 2025

(51) Int. Cl.
*B25J 13/08* (2006.01)
*B25J 9/16* (2006.01)

(52) U.S. Cl.
CPC ........... *B25J 13/088* (2013.01); *B25J 9/1633* (2013.01); *B25J 9/1651* (2013.01); *B25J 9/1669* (2013.01); *B25J 13/08* (2013.01)

(58) Field of Classification Search
CPC ...... B25J 9/1633; B25J 9/1651; B25J 9/1669; B25J 13/088; B25J 13/08; B25J 13/00;
(Continued)

(56) References Cited

U.S. PATENT DOCUMENTS 12,090,661 B2 * 9/2024 Sun ........................ B25J 9/0093
12,319,517 B2 * 6/2025 Sun ........................ B25J 9/1651
2020/0269432 A1 * 8/2020 Beinhofer ............. B25J 19/023

FOREIGN PATENT DOCUMENTS

JP H11-188680 A 7/1999
JP 2004188242 A * 7/2004
(Continued)

OTHER PUBLICATIONS

International Search Report for PCT Application No. PCT/JP2022/016052, mailed on Jun. 21, 2022.

*Primary Examiner* — Ramon A. Mercado
*Assistant Examiner* — Noah W Stiebritz
(74) *Attorney, Agent, or Firm* — Sughrue Mion, PLLC

(57) ABSTRACT

A robot system is configured to move a target object and configured to acquire a measurement result of the physical quantity by a weighing scale at a predetermined time interval from a start time of a period during which a robot arm is associated with a status that indicates that the robot arm is moving while grasping the target object to an end time; in a case where a measurement value of the physical quantity by the weighing scale is fluctuating, after waiting for the robot arm to start operating until the fluctuation in the measurement value subsides, acquire the measurement result of the physical quantity; determine the timing at which the measurement result exceeds a predetermined threshold as the timing at which the grasped target object is released; and cause the robot arm to release the target object at the determined timing.

7 Claims, 5 Drawing Sheets

(58) Field of Classification Search
CPC ......... B25J 15/065; G05B 2219/37357; G05B 2219/39523; G05B 2219/43099; G04B 2219/31313
See application file for complete search history.

(56) References Cited

FOREIGN PATENT DOCUMENTS

| | | | | | |
|---|---|---|---|---|---|
| JP | 2005161507 | A | * | 6/2005 | |
| JP | 2010044530 | A | * | 2/2010 | ............... G05D 1/24 |
| JP | 2017-097847 | A | | 6/2017 | |
| JP | 2017-159428 | A | | 9/2017 | |
| JP | 2018155555 | A | * | 10/2018 | |
| JP | 6981709 | B1 | | 12/2021 | |
| JP | 2025113659 | A | * | 8/2025 | |
| WO | WO-2022224044 | A1 | * | 10/2022 | ............. G06V 20/52 |

* cited by examiner

FIG. 4

| # | PERIOD T | OPERATION | STATUS |
|---|---|---|---|
| 1 | T1(t1~t2) | OPERATION 1 (TARGET OBJECT IS GRASPED) | 0 |
| 2 | T2(t2~t3) | OPERATION 2 (TARGET OBJECT IS MOVED) | 1 |
| 3 | T3(t3~t4) | OPERATION 3 (TARGET OBJECT IS RELEASED) | |
| ... | ... | ... | ... |

| # | CARDBOARD BOX | TYPE OF PRODUCT | NUMBER OF PRODUCTS | WEIGHT PER PRODUCT |
|---|---|---|---|---|
| 1 | CARDBOARD BOX C1 | PRODUCT A | 10 | WEIGHT 1 |
| 2 | CARDBOARD BOX C2 | PRODUCT B | 20 | WEIGHT 2 |
| 3 | CARDBOARD BOX C3 | PRODUCT C | 30 | WEIGHT 3 |
| ... | ... | ... | ... | ... |

ROBOT SYSTEM, PROCESSING METHOD, AND RECORDING MEDIUM

This application is a National Stage Entry of PCT/JP2022/016052 filed on Mar. 30, 2022, the contents of all of which are incorporated herein by reference, in their entirety.

TECHNICAL FIELD

The present disclosure relates to a robot system, a processing method, and a recording medium.

BACKGROUND ART

Robots are used in various fields such as logistics. In Patent Document 1, technology related to a process of ascertaining a contact state between parts using a force sense detection device for detecting a sense of force and controlling a position and posture of a moving part in accordance with the contact state is disclosed as related technology.

PRIOR ART DOCUMENTS

Patent Document

Patent Document 1: Japanese Unexamined Patent Application, First Publication No. H11-188680

SUMMARY

Technical Problem

Meanwhile, in a case where a robot grips a physical object, moves the physical object to a movement destination, and releases the physical object, there is a possibility that the physical object will be damaged in a case where an impact is applied to the physical object according to a timing at which the physical object is released. Therefore, there is a need for technology for identifying a timing at which an impact applied to a physical object can be mitigated in a case where a robot releases the physical object in a robot system.

An objective of each example aspect of the present disclosure is to provide a robot system, a processing method, and a recording medium capable of solving the above-described problem.

Solution to Problem

According to an example aspect of the present disclosure, there is provided a robot system including: a movement means configured to move a target object; and an identification means configured to identify a timing at which the target object is released, based on a physical quantity generated by the target object measured at a movement destination of the target object.

According to another example aspect of the present disclosure, there is provided a processing method to be performed by a robot system including a movement means configured to move a target object, the processing method including: identifying a timing at which the target object is released, based on a physical quantity generated by the target object measured at a movement destination of the target object.

According to yet another example aspect of the present disclosure, there is provided a recording medium storing a program for causing a computer, which includes a robot system including a movement means configured to move a target object, to: identify a timing at which the target object is released, based on a physical quantity generated by the target object measured at a movement destination of the target object.

Advantageous Effects of Invention

According to each example aspect of the present disclosure, a robot system can identify a timing at which an impact to be applied to a physical object can be mitigated in a case where a robot releases the physical object.

BRIEF DESCRIPTION OF DRAWINGS

FIG. 4 is a diagram showing an example of the status of an operation managed by a management unit according to an example embodiment of the present disclosure.

FIG. 5 is a diagram showing an example of a database according to an example embodiment of the present disclosure.

EXAMPLE EMBODIMENT

Hereinafter, example embodiments will be described in detail with reference to the drawings.

Example Embodiment

A robot system 1 according to an embodiment of the present disclosure moves a target object to a movement destination and identifies a timing at which a robot can mitigate an impact applied to the target object in a case where the target object being grasped is released at the movement destination. Examples of the target object include products and the like. In addition, in the present disclosure, grasping includes holding a target object at a position of a robot arm by suctioning the target object as well as holding a target object at a position of a robot arm by pinching the target object. The robot system 1 is used, for example, for inspection of target objects in a warehouse and the like.

Configuration of Robot System

Figure 1:
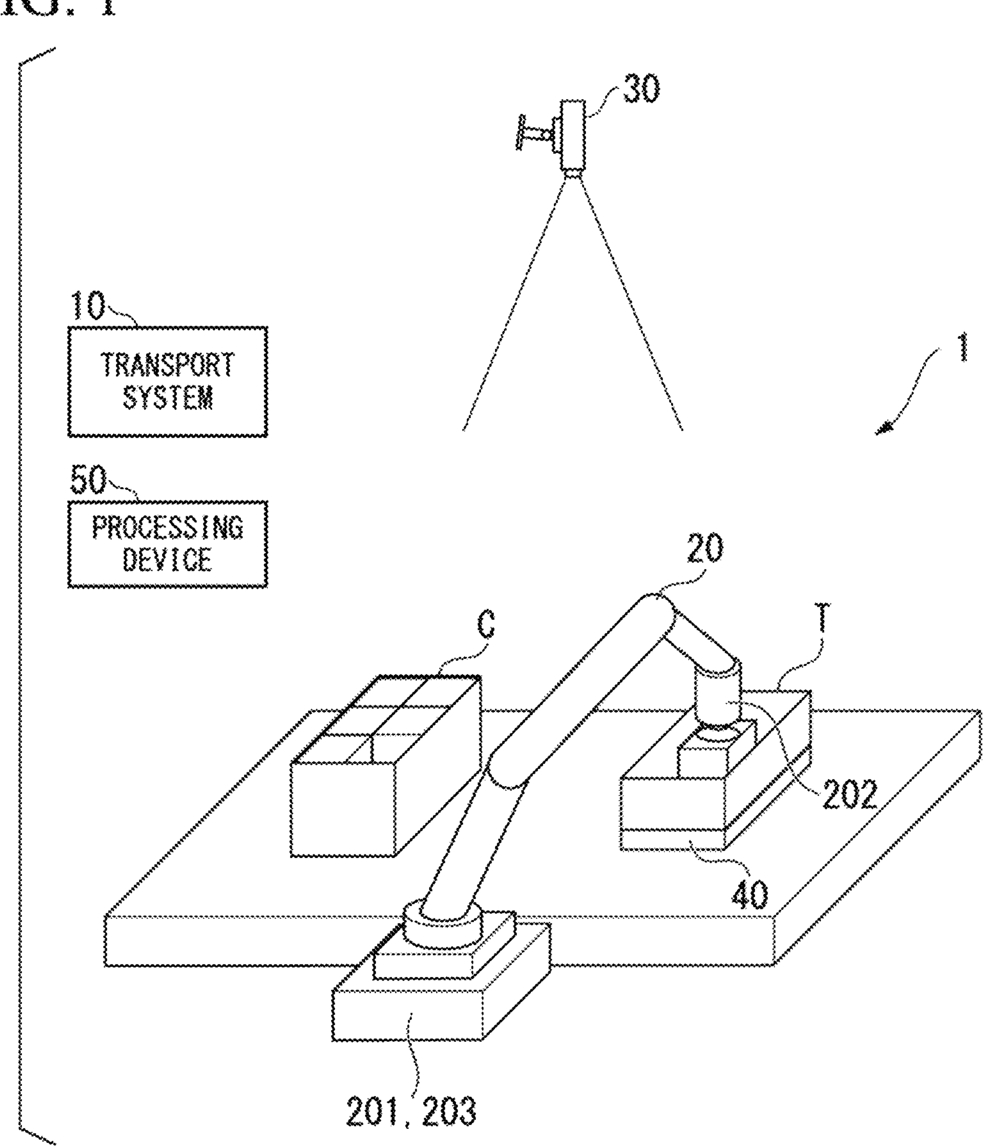
FIG. 1 is a diagram showing an example of a configuration of a robot system according to an example embodiment of the present disclosure.

FIG. 1 is a diagram showing an example of a configuration of the robot system 1 according to an example embodiment of the present disclosure. As shown in FIG. 1, the robot system 1 includes a transport system 10, a robot 20, an imaging device 30, a weighing scale 40 (an example of a measurement means), and a processing device 50.

Figure 2:
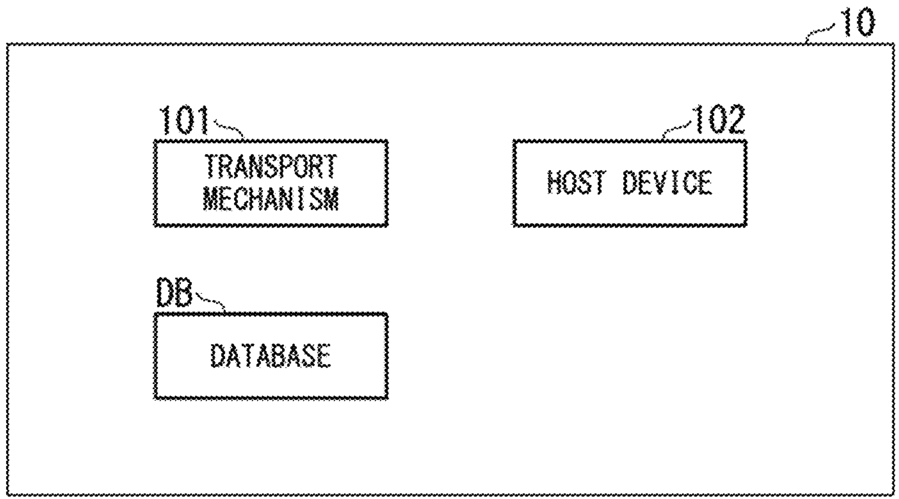
FIG. 2 is a diagram showing an example of a configuration of a transport system according to an example embodiment of the present disclosure.

FIG. 2 is a diagram showing an example of a configuration of the transport system 10 according to an example embodiment of the present disclosure. As shown in FIG. 2, the transport system 10 includes a transport mechanism 101, a host device 102, and a database DB. Examples of the transport system 10 include a warehouse management system (WMS) and the like.

The transport mechanism 101 moves a target object (e.g., a product contained in a cardboard box C) to an area where the robot 20 can operate based on the database DB. Examples of the transport mechanism 101 include an automatic guided vehicle (AGV), a belt conveyor, a crawler, and the like.

Figure 3:
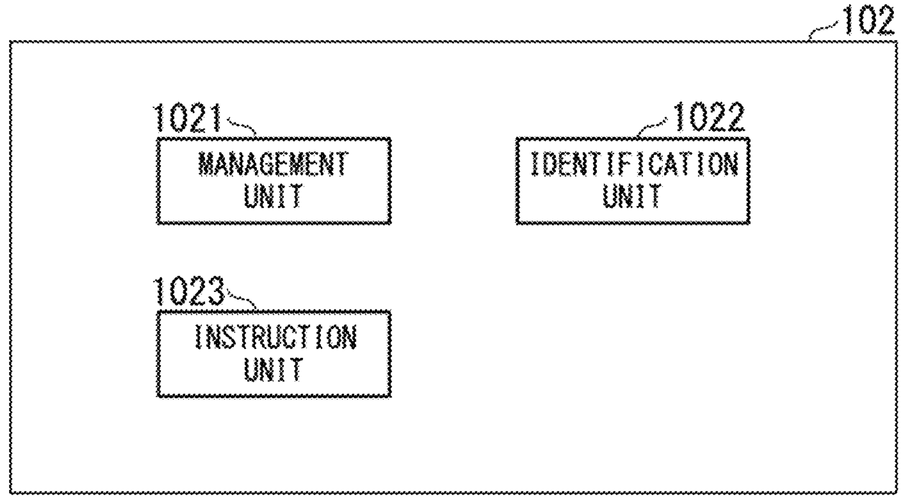
FIG. 3 is a diagram showing an example of a configuration of a host device according to an example embodiment of the present disclosure.

FIG. 3 is a diagram showing an example of a configuration of the host device 102 according to an example embodiment of the present disclosure. As shown in FIG. 3, the host device 102 includes a management unit 1021, an identification unit 1022, and an instruction unit 1023.

The management unit 1021 manages the status of an operation of the robot 20. Examples of the operation of the robot 20 include grasping a target object, moving the target object, releasing the target object, and the like. The status of the operation of the robot 20 is information indicating what operation the robot 20 is performing.

FIG. 4 is a diagram showing an example of the status of the operation managed by the management unit 1021 according to an example embodiment of the present disclosure. In the example shown in FIG. 4, the robot 20 is planned to execute operation 1 (e.g., an operation of grasping a target object) in a period T1 (from time t1 to time t2), operation 2 (e.g., an operation of moving the target object) in a period T2 (from time t2 to time t3), and operation 3 (e.g., an operation of releasing the target object) in a period T3 (from time t3 to time t4). In FIG. 4, status 0 indicates that processing has been performed. Status 1 indicates that processing is in progress. Also, in a case where the status is blank, it indicates that processing is not performed. Thus, the example of the status shown in FIG. 4 indicates that the robot 20 is moving the target object in a state in which the target object has been grasped.

The identification unit 1022 identifies a shape of an individual target object from an image captured by the imaging device 30. The image captured by the imaging device 30 includes information captured by a two-dimensional camera and information of a depth direction. Therefore, the identification unit 1022 can identify the shape of the individual target object.

The instruction unit 1023 outputs an instruction for a planned operation of the robot 20 to the processing device 50 based on the status. Specifically, the instruction unit 1023 outputs an instruction to execute an operation associated with status 1 during a period T associated with status 1 to the processing device 50.

The database DB stores information indicating types of target objects (e.g., products), the number of target objects, and a weight per target object for each cardboard box C. In addition, information indicating the types of target objects, the number of target objects, and the weight per target object is identified, for example, in a case where a barcode reader reads a barcode attached to the cardboard box C in which products are contained at the time of arrival of the products. Also, the barcode reader associates information indicating the types of target objects, the number of target objects, and the weight per target object for each cardboard box C and records the associated information in the database DB.

FIG. 5 is a diagram showing an example of the database DB according to an example embodiment of the present disclosure. The example of the database DB shown in FIG. 5 indicates that a cardboard box C1, a cardboard box C2, and a cardboard box C3 are present, the cardboard box C1 contains 10 products A, the cardboard box C2 contains 20 products B, and the cardboard box C3 contains 30 products C. Moreover, the example of the database DB shown in FIG. 5 indicates that a weight per product A is weight 1, a weight per product B is weight 2, and a weight per product C is weight 3. As shown in FIG. 1, the robot 20 includes a robot body 201, a robot arm 202 (an example of a movement means), and a drive mechanism 203. The robot arm 202 is connected to the robot body 201. In accordance with an operation of the drive mechanism 203, the robot arm 202 grasps a target object contained in the cardboard box C and moves the target object to a movement destination (e.g., a tray T). Also, the robot arm 202 releases the target object at the movement destination.

The drive mechanism 203 operates the robot arm 202. For example, the drive mechanism 203 causes the robot arm 202 to grasp the target object in accordance with a control signal from the processing device 50, move the target object to the movement destination (e.g., the tray T), and release the target object.

The imaging device 30 can capture a target object (e.g., a product) in an area where the robot 20 can operate. The imaging device 30 outputs an image of the captured target object to the transport system 10. The imaging device 30 is, for example, a depth camera.

The weighing scale 40 measures a force generated by the target object at the movement destination (a force applied to the weighing scale 40 by the target object at the movement destination). For example, in a case where the movement destination is the tray T, the weighing scale 40 is provided under the tray T. In addition, in a case where the target object is inspected in a warehouse, an inspection process including whether the target object has a predetermined weight may often be performed. Therefore, there is a high possibility that the weighing scale 40 will be prepared in advance in the warehouse including a system for inspecting products.

Figure 6:
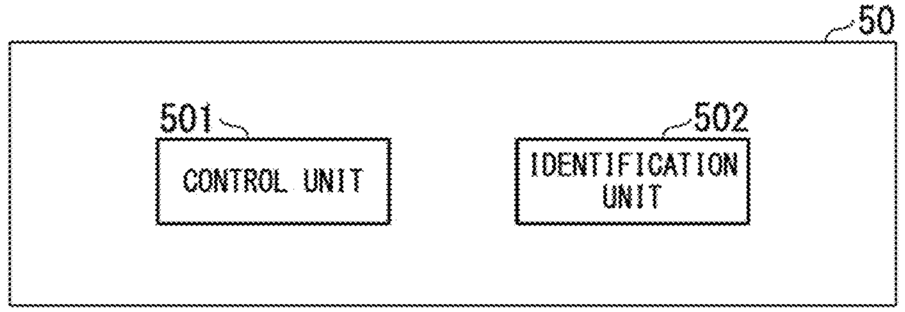
FIG. 6 is a view showing an example of a configuration of a processing device according to an example embodiment of the present disclosure.

FIG. 6 is a diagram showing an example of a configuration of the processing device 50 according to an example embodiment of the present disclosure. As shown in FIG. 6, the processing device 50 includes a control unit 501 (an example of a control means) and an identification unit 502 (an example of an identification means).

The control unit 501 controls an operation of the robot arm 202 in accordance with an instruction from the instruction unit 1023. For example, in accordance with the instruction from the instruction unit 1023, the control unit 501 causes the robot arm 202 to grasp the target object, move the target object to a movement destination, and release the target object at a timing identified by the identification unit 502 at the movement destination. In addition, the control unit 501 causes the robot arm 202 to grasp the target object until the target object is released at the movement destination. That is, the control unit 501 performs control for bringing the target object closer to the movement destination from above the movement destination while causing the robot arm 202 to grasp the target object.

The identification unit 502 identifies a timing at which the target object is released based on a force generated by the target object measured by the weighing scale 40 at the movement destination of the target object. For example, in a case where an operation associated with status 1 is an operation of releasing the target object, the identification unit 502 identifies a timing at which the target object is released within a period T associated with status 1.

Specifically, the identification unit 502 acquires a measurement result of the weighing scale 40 at a predetermined time interval from a start time of the period T. The predetermined time interval here is a sufficiently short time interval compared to the period T. Moreover, the measurement result here is a value read by the weighing scale 40 at each timing corresponding to the predetermined time interval. For example, there are a force by which the robot arm 202 pushes the weighing scale 40 via a target object in a state in which the robot arm 202 grasps the target object, a force applied to the weighing scale 40 by a weight of a target object after the robot arm 202 releases the target object, a force by which the robot arm 202 pushes the weighing scale 40 via a target object in a state in which the robot arm 202 grasps the target object in the presence of a released previous target object, and the like. In addition, in a case where the aforementioned force is applied to the weighing scale 40, there is a possibility that vibration will occur in the weighing scale 40 by acceleration applied to a moving part of the weighing scale 40 due to vibration and noise around the weighing scale 40, a force applied at the time of release of the target object, or the like. As a result, there may be a period during which the value read by the weighing scale 40 fluctuates (a period of free vibration). In this case, the value read by the weighing scale 40 in a state in which the value read by the weighing scale 40 converges to a predetermined magnitude of variation may be taken as the measurement result. That is, the measurement result is the value read by the weighing scale 40 obtained by measuring the force applied to the weighing scale 40 by the target object including the previous target object at each timing as a weight of a physical object. In addition, in a case where the measurement result is fluctuating, the robot arm 202 may wait until the fluctuation of the measurement result subsides, and then push the weighing scale 40 via the target object being grasped, and release the target object being grasped at a timing in a case where a predetermined measurement result is obtained. In addition, the force is expressed as a product of mass (i.e., a weight in the example embodiment of the present disclosure) and acceleration. Therefore, the measurement result is not limited to the value read by the weighing scale 40 obtained by measuring the force applied to the weighing scale 40 by the target object including the previous target object at each timing as the weight of the physical object. For example, the measurement result can be the value read by the weighing scale 40 obtained by measuring the weight or acceleration applied to the weighing scale 40 by the target object including the previous target object at each timing as the weight of the physical object. In addition, the force, weight, and acceleration are examples of physical quantities. The identification unit 502 calculates acceleration by performing a time derivative for the acquired measurement result of the weighing scale 40. Also, the identification unit 502 identifies a timing at which the calculated acceleration exceeds a threshold value as the timing at which the target object is released. In addition, the identification unit 502 stops the acquisition of the measurement result of the weighing scale 40 at the step in which the release timing can be identified. Moreover, in a case where it is not possible to identify the release timing by the end time of the period T, the identification unit 502 ends the process.

Moreover, specifically, the identification unit 502 acquires the measurement result of the weighing scale 40 at a predetermined time interval from the start time of the period T. This predetermined time interval is a sufficiently short time interval compared to the period T. The identification unit 502 calculates a statistical value in a predetermined previous time period (fixed time) with respect to the acquired measurement result of the weighing scale 40. Examples of the statistical value include a mean value, a median value, an average between maximum and minimum values, a mode value, and the like. Also, the identification unit 502 identifies a timing at which the calculated statistical value exceeds the threshold value as the timing at which the target object is released. In addition, the identification unit 502 stops the acquisition of the measurement result of the weighing scale 40 at the step in which the release timing can be identified. Moreover, in a case where it is not possible to identify the release timing by the end time of the period T, the identification unit 502 ends the process.

Process Performed by Robot System

Figure 7:
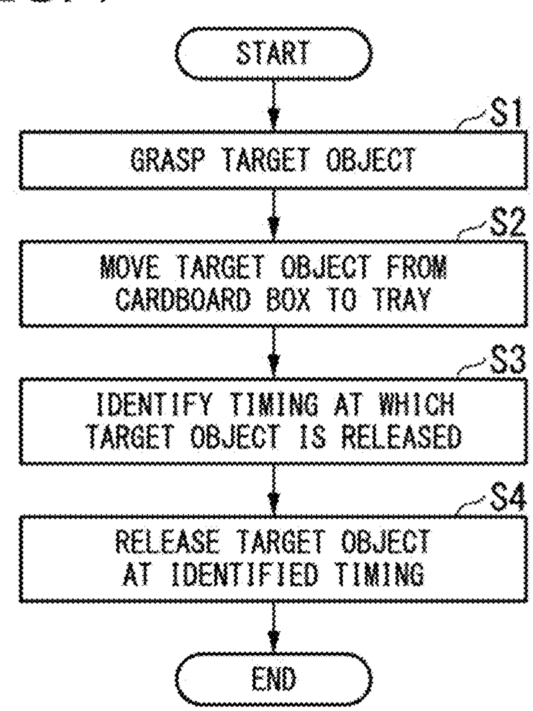
FIG. 7 is a flowchart showing an example of a processing flow of a robot system according to a first example embodiment of the present disclosure.

FIG. 7 is a diagram showing an example of a processing flow of the robot system 1 according to a first example embodiment of the present disclosure. Next, a process to be performed by the robot system 1 will be described with reference to FIG. 7. Here, it is assumed that the operation of the robot 20 is planned to move the target object from the cardboard box C shown in FIG. 1 to the tray T according to, for example, the period T and the operation shown in FIG. 4. Moreover, the instruction unit 1023 outputs an instruction for a planned operation of the robot 20 to the processing device 50 based on a status.

The control unit 501 controls the operation of the robot arm 202 in accordance with an instruction from the instruction unit 1023. Specific examples are shown below.

First, the control unit 501 causes the robot arm 202 to grip the target object contained in the cardboard box C in the period T1 in accordance with an instruction to grip the target object from the instruction unit 1023 (step S1).

In accordance with an instruction to move the target object from the instruction unit 1023, the control unit 501 causes the robot arm 202 to move the target object from the cardboard box C to the above of the tray T during the period T2 (step S2).

The control unit 501 causes the robot arm 202 to release the target object within the period T3 in accordance with an instruction to release the target object from the instruction unit 1023. Specifically, the control unit 501 performs control for bringing the target object closer to a movement destination from above the movement destination while causing the robot arm 202 to grasp the target object. The identification unit 502 identifies a timing at which the target object is released based on a force generated by the target object measured by the weighing scale 40 at the movement destination of the target object (step S3).

Specifically, the identification unit 502 acquires a measurement result of the weighing scale 40 at a predetermined time interval from the start time of the period T. This predetermined time interval is a sufficiently short time interval compared to the period T. The identification unit 502 calculates acceleration by performing a time derivative for the acquired measurement result of the weighing scale 40. Also, the identification unit 502 identifies a timing in a case where the calculated acceleration exceeds the threshold value as the timing at which the target object is released. In addition, the identification unit 502 stops the acquisition of the measurement result of the weighing scale 40 at the step in which the release timing can be identified. Moreover, if it is not possible to identify the release timing by the end time of the period T, the identification unit 502 ends the process.

Moreover, specifically, the identification unit 502 acquires the measurement result of the weighing scale 40 at a predetermined time interval from the start time of the period T. This predetermined time interval is a sufficiently short time interval compared to the period T. The identification unit 502 calculates a statistical value in a predetermined previous time period (fixed time) with respect to the acquired measurement result of the weighing scale 40. Also, the identification unit 502 identifies a timing at which the calculated statistical value exceeds the threshold value as the timing at which the target object is released. In addition, the identification unit 502 stops the acquisition of the measurement result of the weighing scale 40 at the step in which the release timing can be identified. Moreover, in a case where it is not possible to identify the release timing by the end time of the period T, the identification unit 502 ends the process.

Also, the control unit 501 releases the target object at the timing identified by the identification unit 502 (step S4).

In addition, the robot arm 202 may change a movement speed of the target object at the movement destination in accordance with a type of the target object under control of the control unit 501. In addition, in a case where the type of the target object is classified based on a degree of fragility due to falling of the target object, it is only necessary for the robot arm 202 to make a change so that the movement speed of the target object at the movement destination slows down as the degree increases. Also, in this case, it is only necessary for the identification unit 502 to identify a timing at which the target object is released based on a force generated by the target object in accordance with a movement speed changed by the robot arm 202.

Advantage

As described above, the robot system 1 according to the example embodiment of the present disclosure has been described. In the robot system 1, the robot arm 202 (an example of a movement means) moves the target object. The identification unit 502 (an example of an identification means) identifies a timing at which the target object is released based on a force generated by the target object measured at a movement destination of the target object.

The robot system 1 can identify a timing at which an impact applied to the physical object can be mitigated in a case where the robot releases the physical object.

Figure 8:
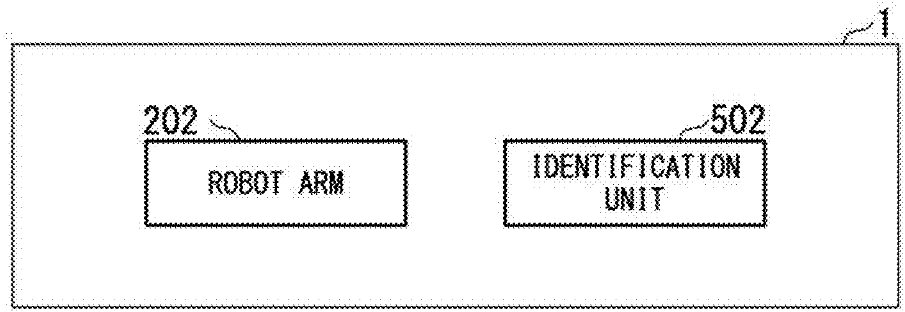
FIG. 8 is a diagram showing a robot system including a minimum configuration according to an example embodiment of the present disclosure.

The robot system 1 including a minimum configuration according to an example embodiment of the present disclosure will be described. FIG. 8 is a diagram showing the robot system 1 including the minimum configuration according to the example embodiment of the present disclosure. The robot system 1 including the minimum configuration according to the example embodiment of the present disclosure includes a robot arm 202 (an example of a movement means) and an identification unit 502 (an example of an identification means).

The robot arm 202 moves a target object. The robot arm 202 can be implemented, for example, using functions of the robot arm 202 exemplified in FIG. 1. The identification unit 502 identifies a timing at which the target object is released based on a force generated by the target object measured at a movement destination of the target object. The identification unit 502 can be implemented, for example, using functions of the identification unit 502 exemplified in FIG. 6.

Figure 9:
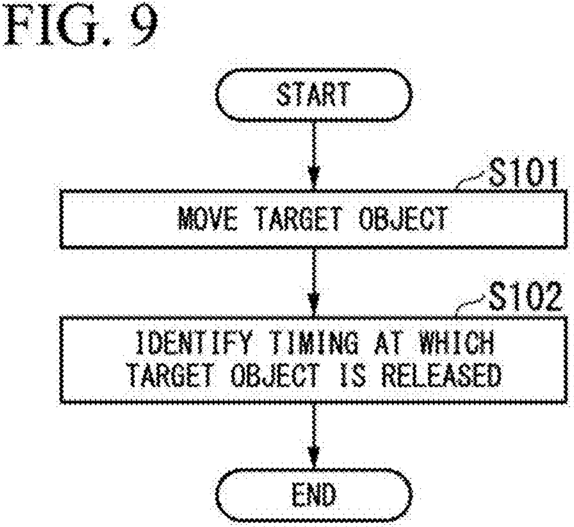
FIG. 9 is a flowchart showing an example of a processing flow of a robot system including a minimum configuration according to an example embodiment of the present disclosure.

Next, a process of the robot system 1 including the minimum configuration will be described. FIG. 9 is a diagram showing an example of the processing flow of the robot system 1 including a minimum configuration. Here, a process of the robot system 1 including the minimum configuration will be described with reference to FIG. 9.

The robot arm 202 moves a target object (step S101). The identification unit 502 identifies a timing at which the target object is released based on a force generated by the target object measured at a movement destination of the target object. (step S102). Thereby, the robot system 1 can identify a timing in a case where an impact applied to the physical object can be mitigated in a case where the robot releases the physical object.

Also, in the process in the example embodiment of the present disclosure, the order of processing may be swapped in a range in which the appropriate process is performed.

Although example embodiments of the present disclosure have been described, the above-described robot system 1, the transport system 10, the robot 20, the processing device 50, and other control devices may include a computer device therein. The process of the above-described processing is stored on a computer-readable recording medium in the form of a program, and the above process is performed by the computer reading and executing the program. A specific example of the computer is shown below.

Figure 10:
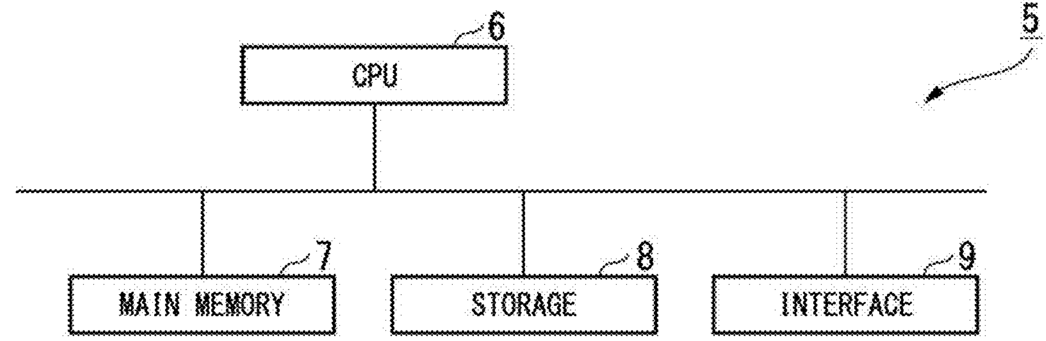
FIG. 10 is a schematic block diagram showing a configuration of a computer according to at least one example embodiment.

FIG. 10 is a schematic block diagram showing a configuration of a computer according to at least one example embodiment. As shown in FIG. 10, a computer 5 includes a central processing unit (CPU) 6, a main memory 7, a storage 8, and an interface 9. For example, each of the above-described robot system 1, the transport system 10, the robot 20, the processing device 50, and other control devices is installed in the computer 5. Also, the operation of each processing unit described above is stored in the storage 8 in the form of a program. The CPU 6 reads the program from the storage 8, loads the program into the main memory 7, and executes the above-described process in accordance with the program. Moreover, the CPU 6 secures a storage area corresponding to each of the above-described storage units in the main memory 7 in accordance with the program.

Examples of the storage 8 include a hard disk drive (HDD), a solid-state drive (SSD), a magnetic disk, a magneto-optical disk, a compact disc read-only memory (CD-ROM), a digital versatile disc read-only memory (DVD-ROM), a semiconductor memory, and the like. The storage 8 may be an internal medium directly connected to a bus of the computer 5 or an external medium connected to the computer 5 via the interface 9 or a communication line. Also, in a case where the above program is distributed to the computer 5 via a communication line, the computer 5 receiving the distributed program may load the program into the main memory 7 and execute the above process. In at least one example embodiment, the storage 8 is a non-transitory tangible storage medium.

Moreover, the program may be a program for implementing some of the above-mentioned functions. Furthermore, the program may be a file for implementing the above-described function in combination with another program already stored in the computer system, a so-called differential file (differential program).

Although several example embodiments of the present disclosure have been described, these example embodiments are examples and do not limit the scope of the present disclosure. In relation to these example embodiments, various additions, omissions, substitutions, and other modifications can be made without departing from the spirit or scope of the present disclosure.

Although some or all of the above-described example embodiments may also be described as in the following supplementary notes, the present disclosure is not limited to the following supplementary notes.

Supplementary Note 1

A robot system including:
- a movement means configured to move a target object; and
- an identification means configured to identify a timing at which the target object is released, based on a physical quantity generated by the target object measured at a movement destination of the target object.

Supplementary Note 2

The robot system according to supplementary note 1, including a measurement means configured to measure the physical quantity.

Supplementary Note 3

The robot system according to supplementary note 2, wherein the measurement means is a weighing scale included in a system for inspecting the target object.

Supplementary Note 4

The robot system according to any one of supplementary notes 1 to 3, wherein the identification means is configured to identify the timing at which the target object is released, based on acceleration obtained by performing a time derivative for a result of measuring the physical quantity.

Supplementary Note 5

The robot system according to any one of supplementary notes 1 to 3, wherein the identification means is configured to identify a timing at which a statistical value of a result of measuring the physical quantity in a predetermined previous time period exceeds a threshold value as the timing at which the target object is released.

Supplementary Note 6

The robot system according to any one of supplementary notes 1 to 5, wherein the identification means is configured to identify the timing in a period indicating a status in which the target object is released.

Supplementary Note 7

The robot system according to any one of supplementary notes 1 to 6,
- wherein the movement means is configured to change a movement speed of the target object at the movement destination in accordance with a type of the target object, and
- wherein the identification means is configured to identify the timing at which the target object is released, based on the physical quantity corresponding to the movement speed changed by the movement means.

Supplementary Note 8

The robot system according to supplementary note 7,
- wherein the type of the target object is classified based on a degree of fragility due to falling, and
- wherein the movement means is configured to make a change so that the movement speed of the target object at the movement destination slows down as the degree increases.

Supplementary Note 9

The robot system according to any one of supplementary notes 1 to 8, including a control means configured to release the target object at a release timing identified by the identification means.

Supplementary Note 10

The robot system according to any one of supplementary notes 1 to 9, wherein the physical quantity is a force, a weight, or acceleration generated by the target object.

Supplementary Note 11

A processing method to be performed by a robot system including a movement means configured to move a target object, the processing method including:
- identifying a timing at which the target object is released, based on a physical quantity generated by the target object measured at a movement destination of the target object.

Supplementary Note 12

A recording medium storing a program for causing a computer, which includes a robot system including a movement means configured to move a target object, to:
- identify a timing at which the target object is released, based on a physical quantity generated by the target object measured at a movement destination of the target object.

INDUSTRIAL APPLICABILITY

According to each example aspect of the present disclosure, a robot system can identify a timing at which an impact to be applied to a physical object can be mitigated in a case where a robot releases the physical object.

REFERENCE SIGNS LIST

1 Robot system
5 Computer
6 CPU
7 Main memory
8 Storage
9 Interface
10 Transport system
20 Robot
30 Imaging device
40 Weighing scale
50 Processing device
101 Transport mechanism

102 Host device
201 Robot body
202 Robot arm
1021 Management unit
1022 Identification unit
1023 Instruction unit
C Cardboard box
10 DB Database
T Tray

What is claimed is:

1. A robot system comprising:

a robot arm configured to move a target object;

a weighing scale configured to measure a physical quantity generated by the target object at a destination of the target object;

a memory configured to store instructions; and a processor configured to execute the instructions to:

acquire a measurement result of the physical quantity by the weighing scale at a predetermined time interval from a start time of a period during which the robot arm is associated with a status that indicates that the robot arm is moving while grasping the target object to an end time;

in a case where a measurement value of the physical quantity by the weighing scale is fluctuating, wait for the fluctuation in the measurement value to subside before starting operation of the robot arm, and after waiting for the fluctuation in the measurement value to subside, acquire the measurement result of the physical quantity;

determine a timing at which the measurement result exceeds a predetermined threshold as the timing at which the grasped target object is released; and cause the robot arm to release the target object at the determined timing.

2. The robot system according to claim 1, wherein the processor is configured to identify the timing at which the target object is released by the robot arm, based on acceleration obtained by performing a time derivative for of a result of measuring the physical quantity.

3. The robot system according to claim 1, wherein the processor is configured to identify a timing at which a statistical value of a result of measuring the physical quantity in a predetermined previous time period exceeds a threshold value as the timing at which the target object is released by the robot arm.

4. The robot system according to claim 1, wherein the robot arm is configured to change a movement speed of the target object at the destination in accordance with a type of the target object, and wherein the processor is configured to identify the timing at which the target object is released by the robot arm, based on the physical quantity corresponding to the movement speed changed by the robot arm.

5. The robot system according to claim 4, wherein the type of the target object is classified based on a degree of fragility due to falling, and wherein the robot arm is configured to make a change so that the movement speed of the target object at the destination slows down as the degree increases.

6. A processing method to be performed by a robot system including a robot arm configured to move a target object and a weighing scale configured to measure a physical quantity generated by the target object at a destination of the target object, the processing method comprising:

acquiring a measurement result of the physical quantity by the weighing scale at a predetermined time interval from a start time of a period during which the robot arm is associated with a status that indicates that the robot arm is moving while grasping the target object to an end time;

in a case where a measurement value of the physical quantity by the weighing scale is fluctuating, waiting for the fluctuation in the measurement value to subside before starting operation of the robot arm, and after waiting for the fluctuation in the measurement value to subside, acquiring the measurement result of the physical quantity;

determining a timing at which the measurement result exceeds a predetermined threshold as the timing at which the grasped target object is released; and causing the robot arm to release the target object at the determined timing.

7. A non-transitory recording medium storing a program for causing a computer, which includes a robot system including a robot arm configured to move a target object and a weighing scale configured to measure a physical quantity generated by the target object at a destination of the target object, to:

acquire a measurement result of the physical quantity by the weighing scale at a predetermined time interval from a start time of a period during which the robot arm is associated with a status that indicates that the robot arm is moving while grasping the target object to an end time;

in a case where a measurement value of the physical quantity by the weighing scale is fluctuating, wait for the fluctuation in the measurement value to subside before starting operation of the robot arm, and after waiting for the fluctuation in the measurement value to subside, acquire the measurement result of the physical quantity;

determine a timing at which the measurement result exceeds a predetermined threshold as the timing at which the grasped target object is released; and cause the robot arm to release the target object at the determined timing.

* * * * *